US006535648B1

United States Patent
Acharya

(10) Patent No.: US 6,535,648 B1
(45) Date of Patent: Mar. 18, 2003

(54) MATHEMATICAL MODEL FOR GRAY SCALE AND CONTRAST ENHANCEMENT OF A DIGITAL IMAGE

(75) Inventor: Tinku Acharya, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/207,753

(22) Filed: Dec. 8, 1998

(51) Int. Cl.⁷ .................................................. H04N 1/46
(52) U.S. Cl. ......................................... 382/274; 382/237
(58) Field of Search ............................... 382/237, 274; 358/461, 456–460, 298, 455

(56) References Cited

U.S. PATENT DOCUMENTS 5,265,200 A * 11/1993 Edgar ........................... 385/131
5,715,334 A * 2/1998 Peters .......................... 382/254
5,767,978 A * 6/1998 Revankar et al. ............ 358/296
5,892,595 A * 4/1999 Yamakawa et al. .......... 358/530
6,023,637 A * 2/2000 Liu et al. ...................... 600/474
6,049,626 A * 4/2000 Kim ............................. 382/167
6,072,907 A * 6/2000 Taylor et al. ................. 382/237
6,097,836 A * 8/2000 Inoue ........................... 382/165

* cited by examiner

Primary Examiner—Thomas D. Lee
Assistant Examiner—Stephen Brinich
(74) Attorney, Agent, or Firm—Blakely, Sokoloff, Taylor & Zafman LLP

(57) ABSTRACT

What is disclosed is a method that specifies identifying a category to which a pixel belongs and performing integrated contrast enhancement and gray scale adjustment on the pixel in accordance with the identified category. These enhanced/adjusted values may be looked up in a table constructed to contain a mapping for all such values.

20 Claims, 6 Drawing Sheets

MATHEMATICAL MODEL FOR GRAY SCALE AND CONTRAST ENHANCEMENT OF A DIGITAL IMAGE

BACKGROUND OF THE INVENTION

1. Field of the Invention

The invention relates generally to image processing. More specifically, the invention relates to enhancement of image characteristics such as contrast, gray level, etc.

2. Description of the Related Art

A digital image such as that captured by a digital camera or scanner can be viewed as consisting of an array of pixel locations each having a particular intensity value. In a Bayer pattern image sensor, each pixel consists of an intensity value associated with one of three color planes, Red, Green or Blue. The image when captured in this form is essentially a gray scale image. Through a process known as color interpolation, the missing two color plane component values for each pixel may be estimated. This process yields a full color image, but may distort or degrade certain image features.

Often in such captured images, it is necessary to highlight or suppress certain image pixels since they were obtained due to poor (low light) or abnormally bright lighting conditions. Such pixels may be "adjusted" for their gray scale intensity values. However, such gray scale adjustment cannot be adequately or efficiently performed after color interpolation. In some cases, even after an image is so adjusted and color interpolated, the contrast of the image may be pleasing to human vision. Enhancing the contrast of an image, while perhaps possible after color interpolation, may not properly work after gray scale adjustment. Additionally, if contrast enhancement is first performed before gray scale adjustment, the adjustment may yield poor results. Color shift and loss of color information may result if such techniques are not properly employed.

Thus, there is a need for an integrated gray scale adjustment and contrast enhancement technique that can be applied directly to a captured image.

SUMMARY OF THE INVENTION

What is disclosed is a method that specifies identifying a category to which a pixel belongs and performing integrated contrast enhancement and gray scale adjustment on the pixel in accordance with the identified category of the pixel.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
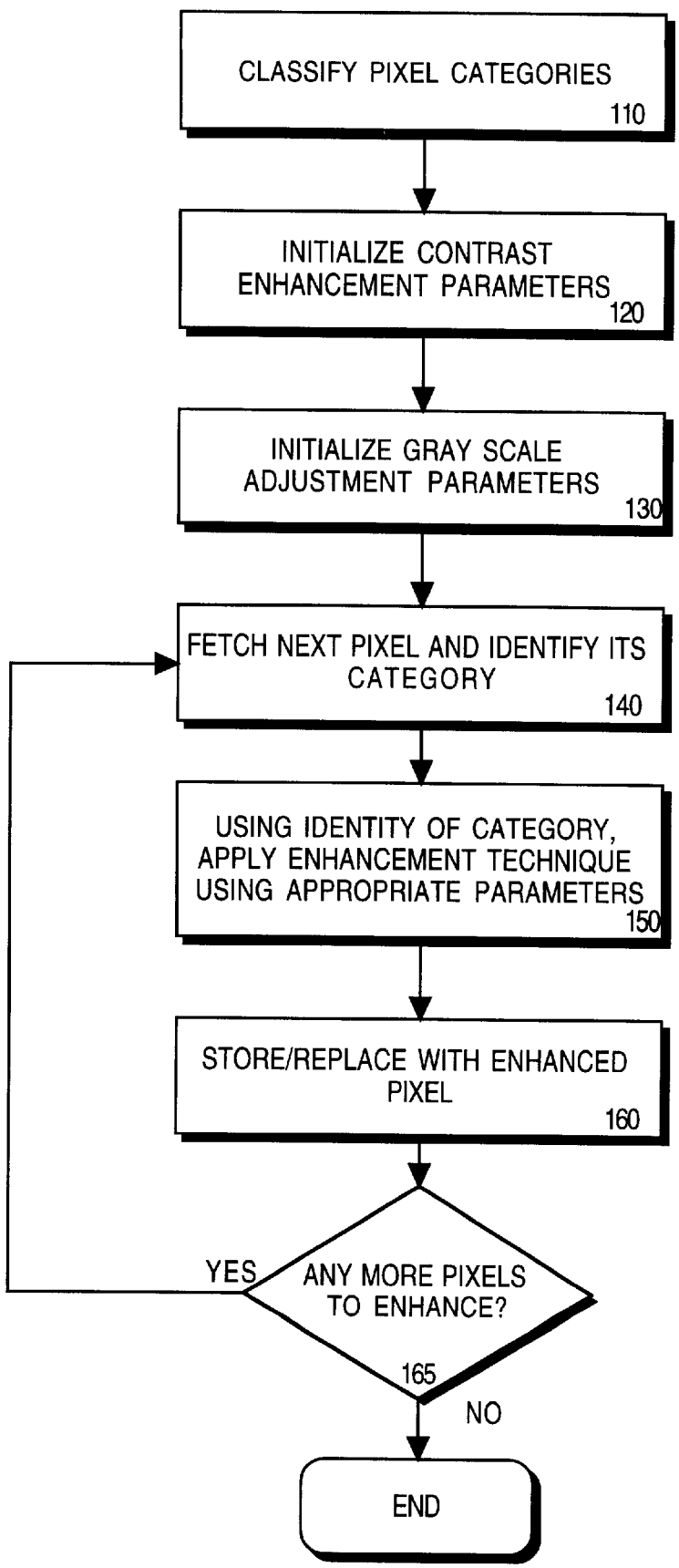
FIG. 1 is a flow diagram illustrating an embodiment of the invention.

FIG. 1 is a flow diagram illustrating an embodiment of the invention.

In a digital image, pixels can be categorized according to their intensity (relative response of a sensor to an illuminant) values. For instance, according to step 110, pixels may be classified into categories using the range of the pixel's intensity response. Due to different lighting and exposure conditions during image capture, it may be desirable to enhance the overall contrast in an image. Thus, a first set of parameters, referred to as "contrast enhancement" parameters are initialized into the system (step 120). Contrast enhancement parameters may vary from captured image to captured image or depending on a mode or desired application may be fixed for all images, or fixed for all images regardless of the intended use or device mode. According to one embodiment of the invention, contrast enhancement is achieved while also being able to highlight/suppress certain image features making them more pleasing to the human visual system. This highlighting/suppression can take the form of gray scale intensity adjustments. Thus, according to step 130, a second set of parameters known as gray scale adjustment parameters are also initialized. Again, these parameters may be fixed or image specific depending upon the image content.

Figure 3:
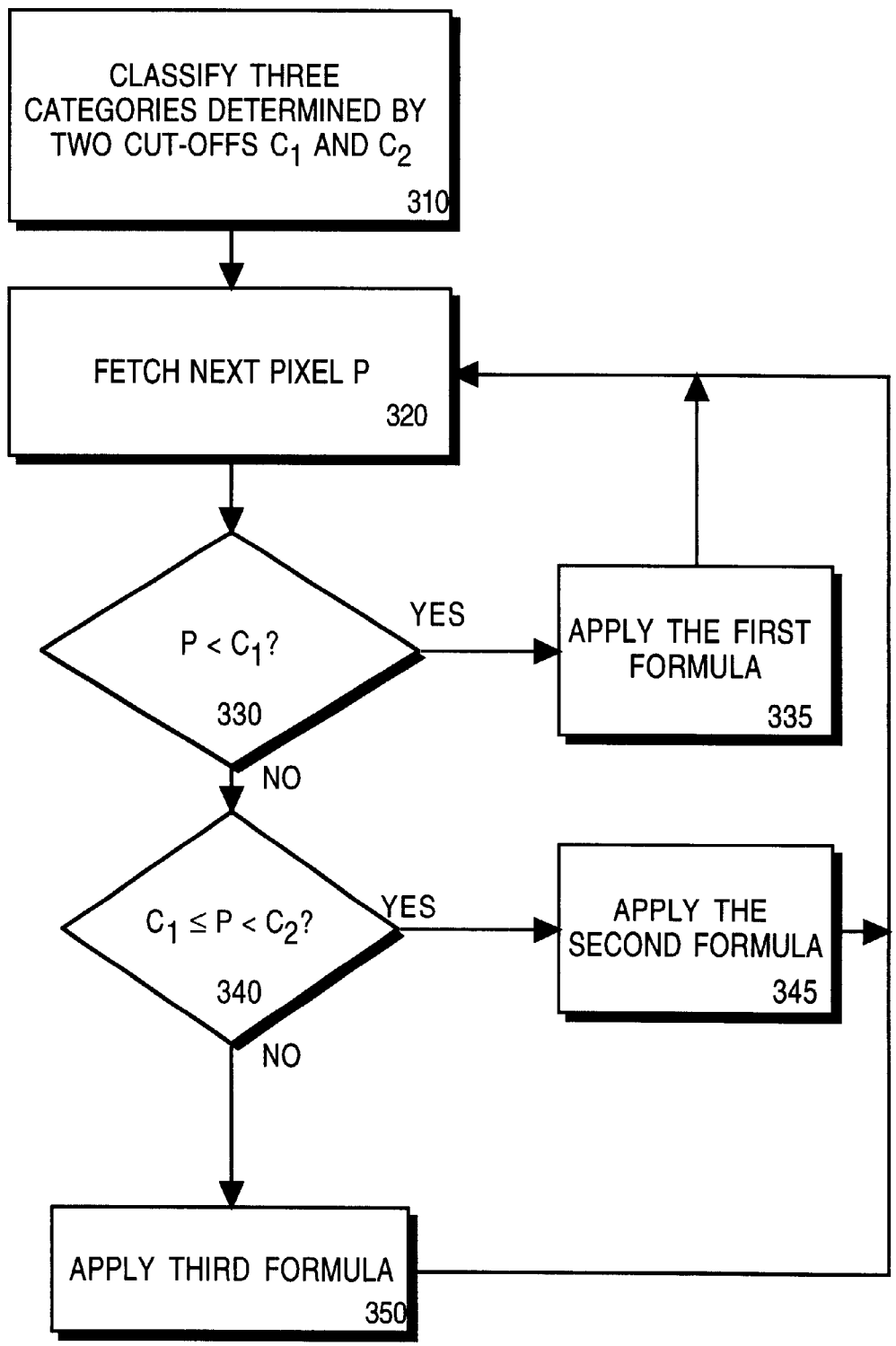
FIG. 3 illustrates a flow diagram for obtaining enhanced/adjusted pixel values according to at least one embodiment of the invention.

Once these parameters are identified, the integrated process of gray scale adjustment and contrast enhancement can commence. First, each pixel is fetched and its category association is identified, according to its intensity level (step 140). Depending on desired system response or use, the process of enhancing and adjusting a pixel may be performed after all pixels have been captured, or while pixels are being captured. Using the identity of the category of the pixel, the enhancement technique is applied using parameters that are appropriate (step 150). An exemplary operation of step 150 is shown in FIG. 3 and described below. As each pixel is fetched and enhanced it is stored separate from the original image data or may replace (overwrite) it (step 160). The process described in steps 140 through 160 repeat until there are no more pixels to enhance (step 165). This may involve only enhancing pixels in a particular geographical area or all pixels in the image.

Figure 2:
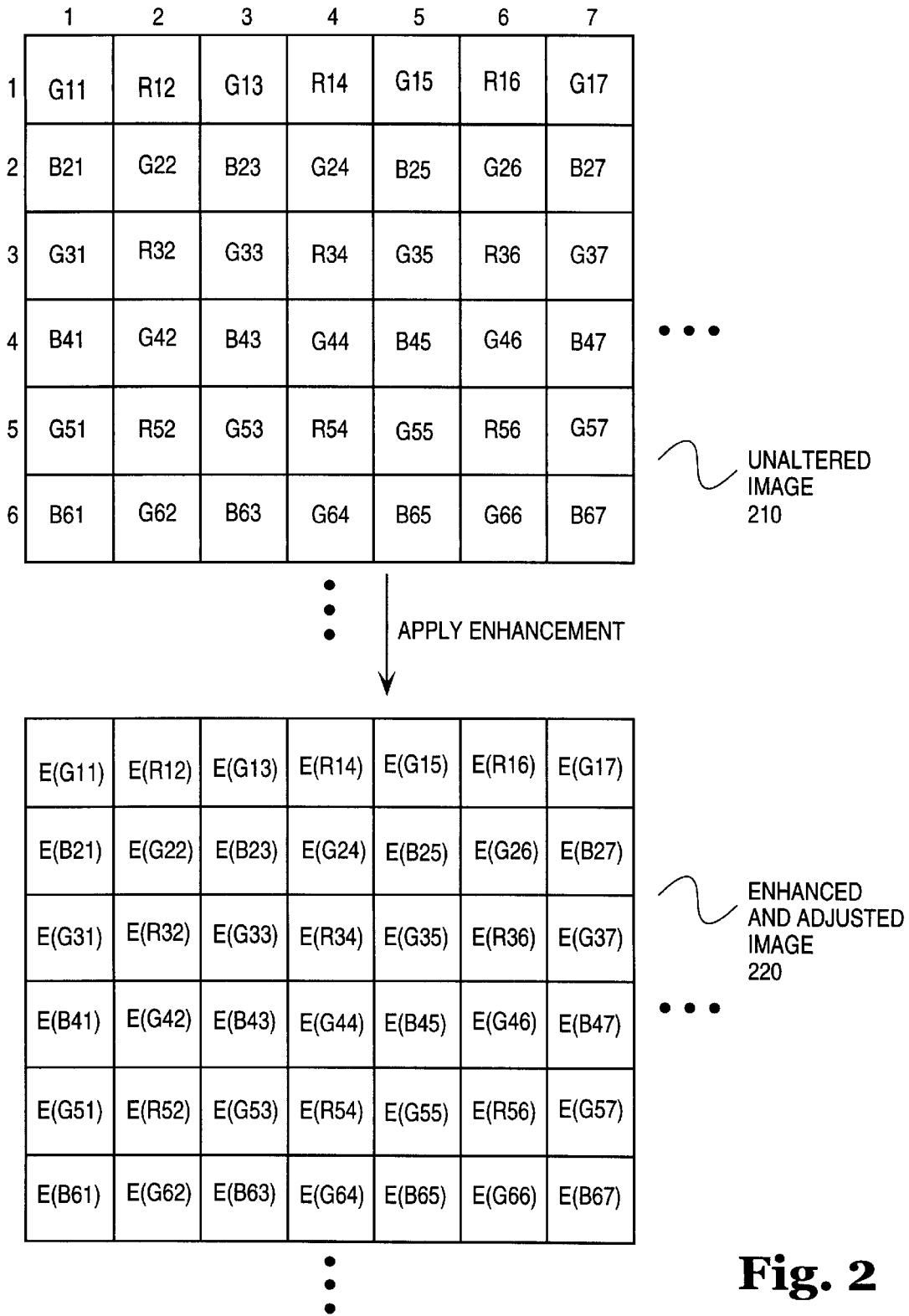
FIG. 2 illustrates the application of one or more embodiments of the invention.

FIG. 2 illustrates the application of one or more embodiments of the invention.

FIG. 2 shows an unaltered image 210 and an enhanced and adjusted image 220. Image 210 is shown having pixels designated generally by CXY, where C refers to the color plane association (Red-R, Green-G or Blue-B) of the pixel, while X and Y refer to the pixel's location, specifically the pixel's row and column index, respectively. Image 210 exemplifies a Bayer pattern captured image which has G associated pixels on every row and alternates B and R pixels on every other row. While image 210 is shown as a Bayer pattern image, any type of image, color or monochrome, in any pattern, may utilize the techniques described in the various embodiments of the invention. The unaltered image 210 may be composed of many more than the seven columns and six rows of pixels shown in FIG. 2, that configuration being merely exemplary.

Once the integrated image enhancement and gray scale adjustment procedure is complete, the enhanced and adjusted image 220 will result. Image 220 is shown to also consist of the same number of pixel locations as the image 210, but with each pixel given a new enhanced/adjusted value E(P) where P is the original pixel in image 210. Each E(P) pixel is both contrast enhanced and gray scale adjusted and may or may not retain the same intensity value as its corresponding counterpart in unaltered image 210. Also, the color plane association of the pixels is maintained so that the pixel E(G11) is also Green associated as was G11 in the unaltered image. In an alternate embodiment, the pixels E(P) may instead represented a color interpolated pixel set such that each pixel location has estimated values for all three color planes, R, G and B, rather than only one value. Each E(P) may have the same precision/resolution as the unaltered counterpart or may differ depending on the desired system design.

FIG. 3 illustrates a flow diagram for obtaining enhanced/adjusted pixel values according to at least one embodiment of the invention.

In one embodiment of the invention three categories of the pixels are classified These three categories may be determined with reference to two cutoff values C1 an C2. If P is the intensity value of a pixel, then it belongs to one of these three categories:

I: P<C1

II: C1 P C2

III: P>C2

Pixels whose intensity values are associated with category I are of low intensity due to insufficient lighting condition while category III pixels are of relatively high intensity. Both the pixels in categories I and III have non-uniform behavior. The pixels in category II are uniformly generated due to uniform lighting condition.

The embodiment of FIG. 3 illustrates a real-time enhancement and adjustment procedure. Accordingly, each pixel's intensity value P is fetched in turn (step 320). If P<C1 i.e., if it belongs to category I (checked at step 330), then a first formula is applied (step 335) to bring up the contrast and gray scale values to a higher level. If not, then P may belong to category II or III. If P lies between C1 (inclusive) and C2 (checked at step 330), then a second formula is applied (step 345) which is just result of scaling the intensity by a constant factor. If not, then P must by default belong to category III (having a value greater than C2) and thus a third formula is applied (step 350). Each formula models the desired response in the particular category (i.e., intensity classification) and performs both contrast enhancement and gray scale adjustment in a single computation. Given below are three such formulas.

$E(P) = k_1 * C_1 - (k_1 * C_1 - P)^{\alpha 1}$      Category I $E(P) = k_3 * P$      Category II $E(P) = k_2 * C_2 + |k_2 * C_2 - P|^{\alpha 2}$      Category III where $k_1$, $k_2$ and $k_3$ are contrast enhancement parameters and $\alpha 1$, $\alpha 2$ are gray scale adjustment parameters. The gray scale adjustment parameters $\alpha 1$ and $\alpha 2$ are not utilized in the Category II formula and thus, no gray scale adjustment is needed for pixels in this category but the contrast is enhanced by multiplying with the scale factor $k_3$. However, category I and category II pixels are gray scale adjusted in accordance with $\alpha 1$ and $\alpha 2$, respectively. The scale factors $k_1$ and $k_2$ are used to enhance the contrast values up to a fixed level depending on $C_1$ and $C_2$ whereas the exponents $\alpha 1$ and $\alpha 2$ produces a form of gamma correction of the pixels to correct the non-uniformity in order to make it pleasing to human vision. The logic illustrated in FIG. 3 represents a real time approach to the integrated contrast enhancement and gray scale adjustment. Since the intensity value range is dependent upon a fixed resolution per pixel in most image sensors, it may be possible to pre-compile a table that maps each possible intensity value to an enhanced/adjusted values.

Figure 4:
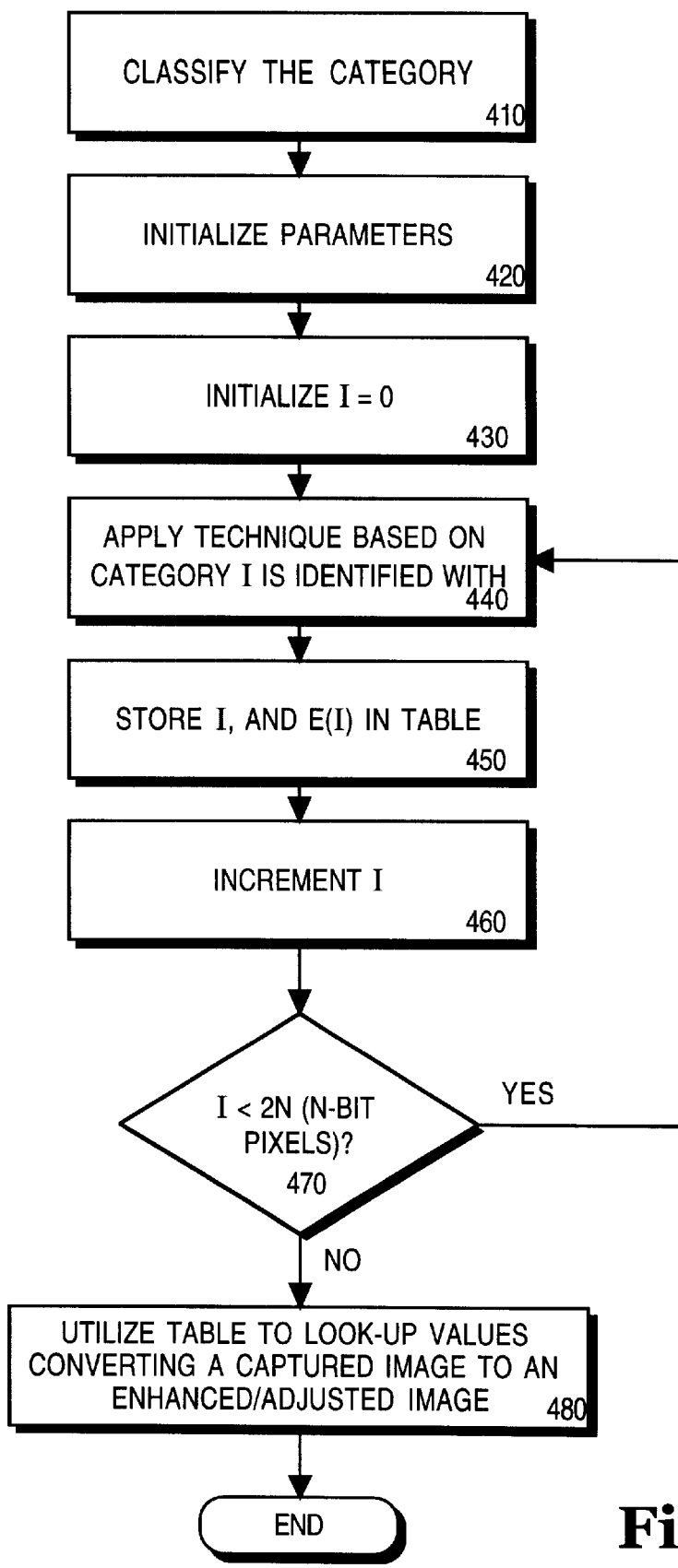
FIG. 4 illustrates a flow diagram for converting captured image pixel values to enhanced/adjusted pixel values according to at least one embodiment of the invention.

FIG. 4 illustrates a flow diagram for converting captured image pixel values to enhanced/adjusted pixel values according to at least one embodiment of the invention.

If each pixel location has a known, fixed and uniform resolution, which is often the case in image sensing devices, then a look-up table (LUT) may be constructed which maps each possible intensity value to its corresponding enhanced/adjusted value. Such a LUT may be constructed as shown in FIG. 4. First, the pixel categories should be classified (step 410). Next, parameters such as contrast enhancement and gray scale adjustment parameters should be set or initialized (step 420). If each pixel in the image sensing array has a N-bit depth or resolution, then any one of a total of $2^N$ intensity values are possible for a given pixel's intensity reading. Using a counting value I, the enhanced/adjusted equivalent for each possible intensity value may be computed. If the intensity readout ranges from 0 to $2^{N-1}$ in a sensor, the count I could first be initialized to 0 (step 430). Next, the technique (formula(s) described above) would be applied based upon the category that I is identified with (step 440). The value of I and the computed value of E(I) is then stored in the table both on the same row such that a pixel value may be used as an address (or as an offset to an address such that only the computed E(I) values need to be stored) (step 450). I is then incremented such that the next enhanced/adjusted E(I) may be computed. If I is less than $2^N$ then steps 440 through 460 are repeated using the new, incremented I (checked at step 470). If I exceeds $2^{N-1}$ then the LUT is considered completed and may be utilized to look up values for converting a captured image into an enhanced image. By utilizing a LUT, repetitive calculations are avoided and thus allows image processing to occur more efficiently. Each intensity value in the pixel can be directly replaced by a mere look up in the LUT, which could be reconstructed if changing parameters, pixel categories or formulations of the enhancement/adjustment are desired.

Figure 5:
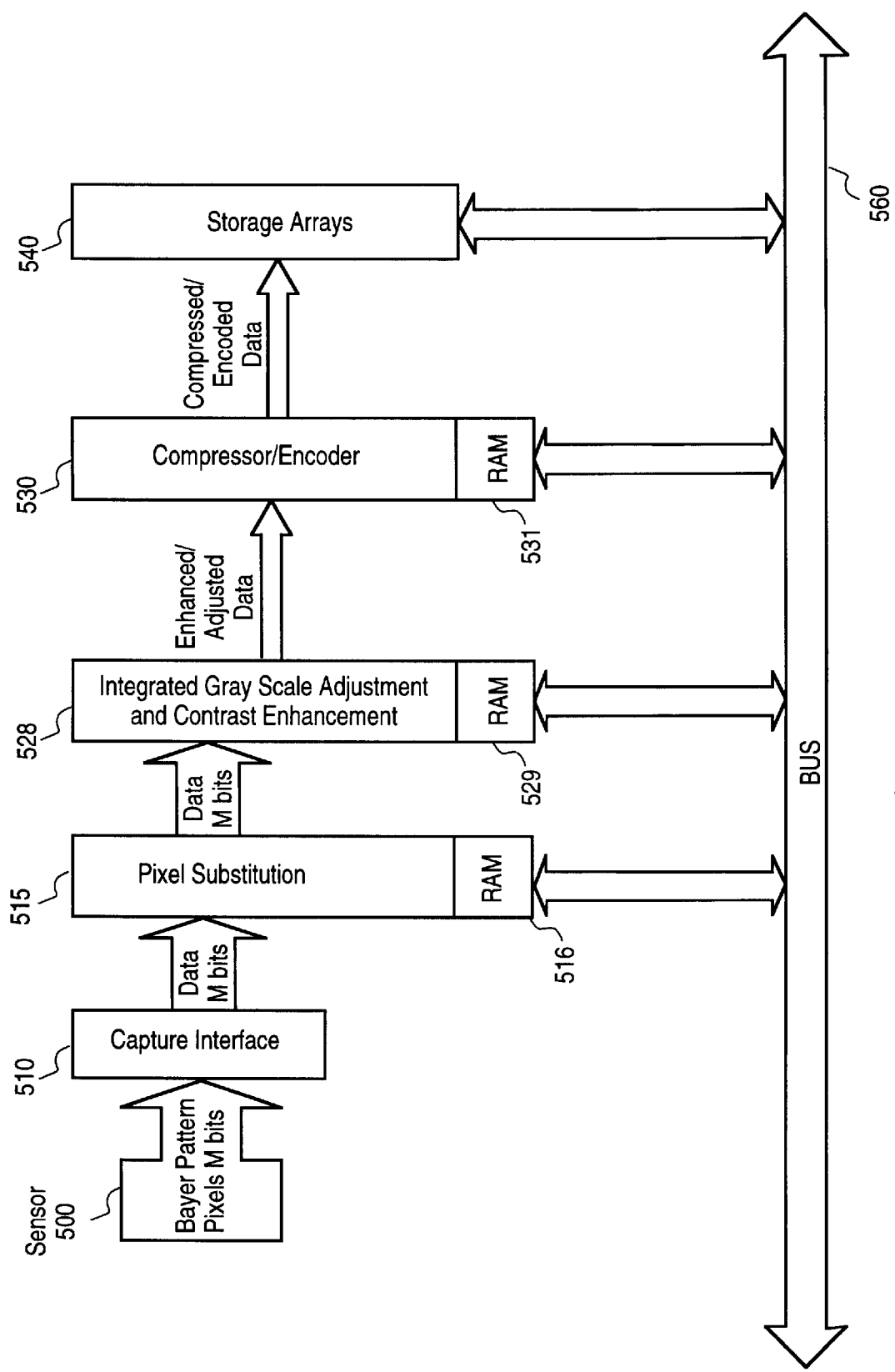
FIG. 5 is a block diagram of an image processing apparatus according to an embodiment of the invention.

FIG. 5 is a block diagram of an image processing apparatus according to an embodiment of the invention.

FIG. 5 is a block diagram of internal image processing components of an imaging device incorporating at least one embodiment of the invention including an adaptive encoder. In the exemplary circuit of FIG. 5, a sensor 500 generates pixel components which are color/intensity values from some scene/environment. The M-bit pixel values generated by sensor 500 are sent to a capture interface 510. Sensor 500 in the context relating to the invention will typically sense one of either R, G, or B components from one "sense" of an area or location. Thus, the intensity value of each pixel is associated with only one of three color planes and may form together a Bayer pattern raw image. Capture interface 610 resolves the image generated by the sensor and assigns intensity values to the individual pixels. The set of all such pixels for the entire image is in a Bayer pattern in accordance with typical industry implementation of digital camera sensors.

It is typical in any sensor device that some of the pixel cells in the sensor plane may not respond to the lighting condition in the scene/environment properly. As a result, the pixel values generated from these cell may be defective. These pixels are called "defective pixels." The "pixel substitution" unit 515 replaces each dead pixel by the immediate previously valid pixel in the row. A RAM (Random Access Memory) 516 consists of the row and column indices of the dead pixels, which are supplied by the sensor. This RAM 516 helps to identify the location of dead pixels in relation to the captured image.

This sensor data may then be passed to a Integrated Gray Scale Adjustment and Contrast Enhancement module 528 which executes gray scale adjustment and contrast enhancement upon the captured image. Module 528 may either act in real-time by implementing directly the computation for the adjustment/enhancement process illustrated in FIG. 3 or utilize a look-up table constructed in accordance with FIG. 4 that is loaded via bus 560 from an external device. Such a look-up table which already maps all possible intensity values to corresponding enhanced/adjusted values may be stored in a RAM 531 that can be accessed with reference to the data values used as addresses or offsets to addresses for RAM 531. By applying gray scale adjustment and contrast enhancement directly to the captured image and prior to any color interpolation color shift is avoided.

A compressor/encoder 530 receives sensor image data and performs image compression and binary encoding. A RAM 531 can be used to store coefficients and/or quantization thresholds as desired in executing these compression techniques. Compressor/encoder 530 reduces the total size of the image data by exploiting factors such as data correlation. Compressed/encoded data can then be stored in storage arrays 540.

Each of the RAM tables 516, 526, 531 and 529 can directly communicate with a bus 560 so that their data can be loaded and then later, if desired, modified. Further, those RAM tables and other RAM tables may be used to store intermediate result data as needed and may be part of the same physical memory space even though depicted in FIG. 5 as being distinct.

Figure 6:
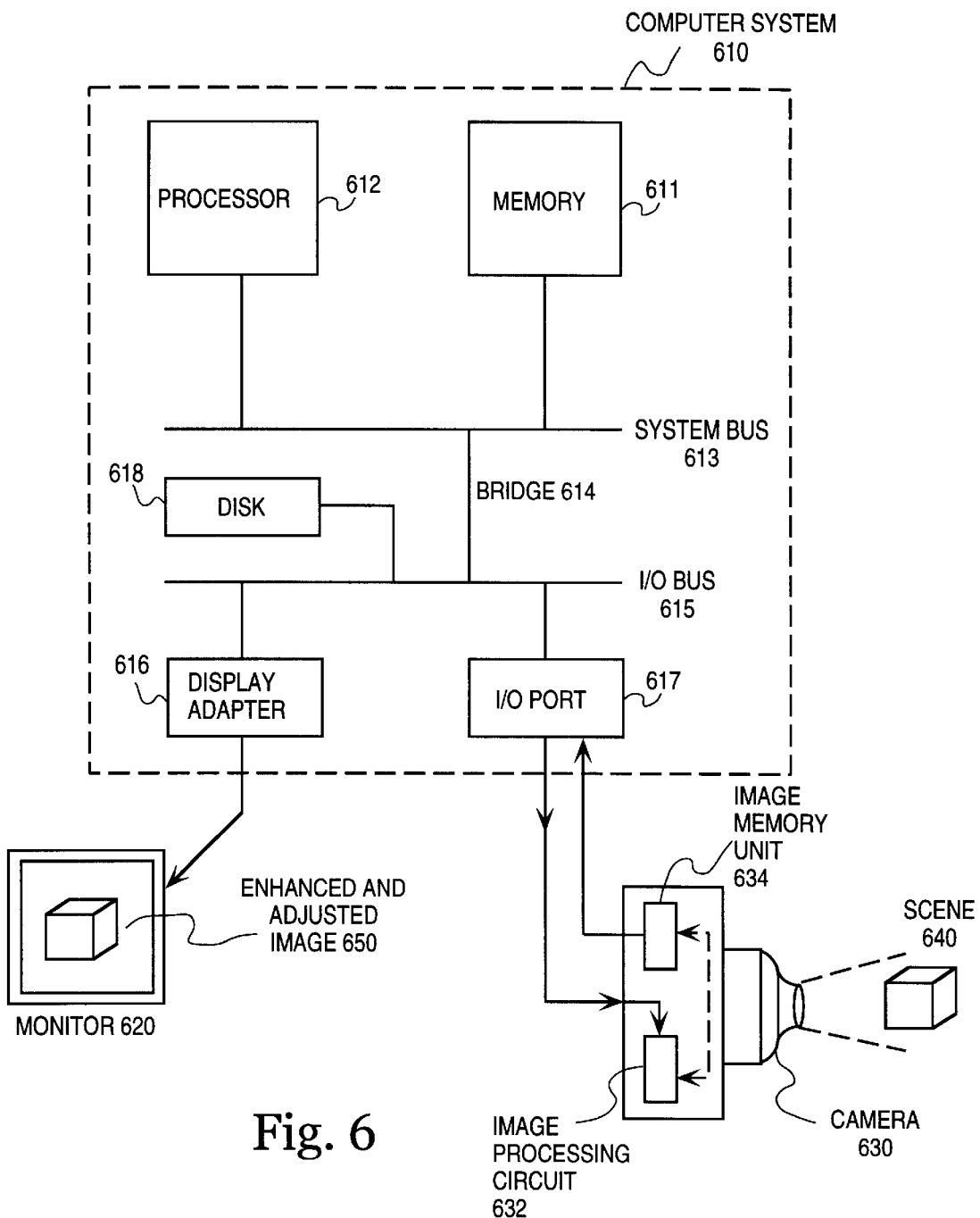
FIG. 6 is a system diagram of one embodiment of the invention.

FIG. 6 is a system diagram of one embodiment of the invention.

Illustrated is a computer system 610, which may be any general or special purpose computing or data processing machine such as a PC (personal computer), coupled to a camera 630. Camera 630 may be a digital camera, digital video camera, or any image capture device or imaging system, or combination thereof and is utilized to capture an image of a scene 640. Essentially, captured images are processed by an image processing circuit 632 so that they can be efficiently stored in an image memory unit 634, which may be a ROM, RAM or other storage device such as a fixed disk. The image contained within image memory unit 634 that is destined for computer system 610 can be according to one embodiment of the invention, stored directly as gray scale adjusted and contrast enhanced data. In most digital cameras that can perform still imaging, images are stored first and downloaded later. This allows the camera 630 to capture the next object/scene quickly without additional delay. The invention in its various embodiments, particularly in providing a compressed image that is directly enhanced/adjusted from the captured raw image, enhanced the quality of images generated by camera 630.

The image processing circuit 632 may carry out the integrated contrast enhancement and gray scale adjustment prior to the images being downloaded from camera 630. This prevents any loss from the compression process from being introduced before enhancement/adjustment which may adversely impact image quality. When an enhanced/adjusted image that has been compressed is downloaded to computer system 610, it may be decoded and then rendered to some output device such as a printer (not shown) or to a monitor device 620. Image decoding and rendering may be achieved using a processor 612 such as the Pentium™ (a product of Intel Corporation) Processor and a memory 611, such as RAM, which is used to store/load instruction addresses and result data.

Where image processing circuit 632 utilizes a look-up table to obtain enhanced/adjusted values, the table construction techniques described above may be achieved in a software application running on computer system 610 rather than directly in camera 630. The constructed table may then be loaded into camera 630. In such an embodiment, the image processing circuit may advantageously store only the mapping table and thus be relieved of the computational duty involved in implementing enhancement/adjustment formulas. The application(s) used to perform the table construction and/or decoding after download from camera 630 may be from an executable compiled from source code written in a language such as C++. The instructions of such executable/source files may be stored to a disk 618 or memory 611. Further, such application software may be distributed on a network or a computer-readable medium for use with other systems. In yet another embodiment, the entire enhancement/adjustment technique may be performed on the computer system 610, with a look-up table stored in disk 618, memory 611 or by implementing the process of FIG. 3, which is a real-time method on computer system 610 by use of application software executed thereon.

When an image, such as an image of a scene 640, is captured by camera 630, it is sent to the image processing circuit 632. Image processing circuit 632 consists of ICs and other components which execute, among other functions, the integrated enhancement/adjustment o a captured image. The image memory unit 634 will store the compressed and encoded data. Once all pixels are processed and stored or transferred to the computer system 610 for rendering the camera 630 is free to capture the next image. When the user or application desires/requests a download of images, the encoded image data in the image memory unit, are transferred from image memory unit 634 to the I/O port 616. I/O port 617 uses the bus-bridge hierarchy shown (I/O bus 615 to bridge 614 to system bus 613) to temporarily store the data into memory 611 or, optionally, disk 618. Computer system 610 has a system bus 613 which facilitates information transfer to/from the processor 612 and memory 611 and a bridge 614 which couples to an I/O bus 615. I/O bus 615 connects various I/O devices such as a display adapter 616, disk 618 and an I/O port 617, such as a serial port. Many such combinations of I/O devices, buses and bridges can be utilized with the invention and the combination shown is merely illustrative of one such possible combination.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
    classifying a plurality of pixel categories by determining a set of cut-off values, said cut-off values defining distinct intensity ranges;

initializing a plurality of contrast enhancement parameters;

initializing a plurality of gray scale adjustment parameters;

identifying a category to which a pixel belongs; and performing contrast enhancement and gray scale adjustment on said pixel in accordance with said identified category wherein for each category said parameters and said cut-off values are utilized in a different manner to achieve said enhancement and adjustment.

2. A method according to claim 1 further comprising:

replacing said pixel with an enhanced and adjusted pixel resulting from said performance.

3. A method according to claim 1 wherein said enhancement parameters are multipliers and said adjustment parameters are exponents.

4. A method according to claim 1 wherein three categories are defined by two cut-off values, and for pixels belonging to one of the categories no gray scale adjustment occurs.

5. A method according to claim 1 further comprising:

constructing a look-up table mapping all possible intensity values to enhanced and adjusted values.

6. A method according to claim 5 wherein the performing of enhancement and adjustment includes looking up for each pixel of an image its corresponding enhanced and adjusted value.

7. A method according to claim 5 wherein the constructing comprises:

initializing a counting variable representing a possible pixel value;

performing said enhancement and adjustment in accordance with the category with which said counting variable is identified;

storing into said table the enhanced/adjusted value resulting from said application;

incrementing said counting variable; and repeating said applying, storing and incrementing for each possible intensity value of the variable.

8. A machine-readable medium having data stored thereon that when accessed by a machine cause the machine to perform operations comprising:

initializing contrast enhancement and gray scale adjustment parameters;

identifying a category to which a pixel belongs based on a plurality of pixel categories that depend on a set of cut-off values, said cut-off values defining distinct intensity ranges; and performing contrast enhancement and gray scale adjustment on said pixel in accordance with said identified category wherein for each category said parameters and said cut-off values are utilized in a different manner to achieve said enhancement and adjustment.

9. The machine readable medium of claim 8, further comprising data that when accessed cause the machine to:

replace said pixel with an enhanced and adjusted pixel resulting from said performance.

10. The machine readable medium of claim 8, further comprising data that when accessed cause the machine to:

identify and perform said enhancement and adjustment upon all pixels in an image.

11. The machine readable medium of claim 8, wherein the stored data are such that three categories are defined by two cut-off values.

12. The machine readable medium of claim 8, further comprising data that when accessed cause the machine to:

construct a look-up table mapping all possible intensity values to enhanced and adjusted values.

13. The machine readable medium of claim 12, wherein the stored data are such that the performing of enhancement and adjustment includes looking up for each pixel of an image its corresponding enhanced and adjusted value.

14. The machine readable medium of claim 12, wherein the stored data are such that said constructing comprises:

initializing a counting variable;

performing said enhancement and adjustment in accordance with a category with which said counting variable is identified;

storing into said table an enhanced/adjusted value resulting from said application;

incrementing said counting variable; and repeating said applying, said storing and said incrementing for each possible value of the variable.

15. A system comprising:

a camera having an image sensor to capture a digital image, a memory to store data and a processor coupled to said memory, the processor to access said data to initialize a plurality of contrast enhancement parameters; initialize a plurality of gray scale adjustment parameters; identify a category to which a pixel of the digital image belongs from a plurality of distinct intensity ranges defined by a set of cut-off values; perform contrast enhancement and gray scale adjustment on said pixel in accordance with said identified category wherein for each category said parameters and said cut-off values are applied in a different manner to achieve said enhancement and adjustment.

16. The system according to claim 15, wherein the memory has further data that when accessed cause:

replacing said pixel with an enhanced and adjusted pixel resulting from said performance.

17. The system according to claim 15, wherein the memory has further data that when accessed cause:

identifying and performing said enhancement and adjustment upon all pixels in said image.

18. The system according to claim 15, wherein the stored data are such that three categories are defined by two cut-off values.

19. A method for creating a look-up table adapted to provide an enhanced and adjusted value corresponding to an intensity value of a given pixel, comprising:

initializing a counting variable;

applying contrast enhancement and gray scale adjustment, in accordance with a category with which said counting variable is identified, said category being one of a plurality defined by a set of cut-off values defining distinct intensity ranges, wherein for each category, a different function of contrast enhancement and gray scale parameters and the cut-off values are applied to achieve said enhancement and adjustment;

storing into a table an enhanced/adjusted value resulting from said application;

incrementing said counting variable; and repeating said applying, said storing and said incrementing operations for each possible value of the variable.

20. The method according to claim 19, further comprising:

looking up for each pixel in an image its corresponding enhanced and adjusted value.

* * * * *